United States Patent
Jeong et al.

(10) Patent No.: US 12,020,715 B2
(45) Date of Patent: Jun. 25, 2024

(54) METHOD AND APPARATUS FOR LABEL ENCODING IN POLYPHONIC SOUND EVENT INTERVALS

(71) Applicant: ELECTRONICS AND TELECOMMUNICATIONS RESEARCH INSTITUTE, Daejeon (KR)

(72) Inventors: Young Ho Jeong, Daejeon (KR); Soo Young Park, Daejeon (KR); Tae Jin Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 25 days.

(21) Appl. No.: 17/672,403

(22) Filed: Feb. 15, 2022

(65) Prior Publication Data

US 2022/0301571 A1 Sep. 22, 2022

(30) Foreign Application Priority Data

Mar. 17, 2021 (KR) .................. 10-2021-0034713

(51) Int. Cl.
*G06F 17/00* (2019.01)
*G06N 3/08* (2023.01)
*G10L 19/018* (2013.01)

(52) U.S. Cl.
CPC .............. *G10L 19/018* (2013.01); *G06N 3/08* (2013.01)

(58) Field of Classification Search
CPC ................................ G10L 19/018; G06N 3/08

USPC ........................................................ 704/500
See application file for complete search history.

(56) References Cited

U.S. PATENT DOCUMENTS

| | | | |
|---|---|---|---|
| 2012/0215519 A1* | 8/2012 | Park ....................... | H04R 3/005 381/17 |
| 2012/0224456 A1* | 9/2012 | Visser ..................... | G01S 7/521 367/118 |
| 2013/0035935 A1 | 2/2013 | Kim et al. | |
| 2015/0242180 A1* | 8/2015 | Boulanger-Lewandowski ............ | G06N 3/044 700/94 |
| 2015/0334502 A1 | 11/2015 | Watanabe et al. | |
| 2019/0043477 A1* | 2/2019 | Bang ....................... | G10L 15/20 |

(Continued)

FOREIGN PATENT DOCUMENTS

| | | |
|---|---|---|
| JP | 2014-164126 A | 9/2014 |
| KR | 10-2018-0117704 A | 10/2018 |

OTHER PUBLICATIONS

Adavanne; Sound Event Detection Using Weakly Labeled Dataset With Stacked Convolutional and Recurrent Neural Network (Year: 2017).*

(Continued)

*Primary Examiner* — Paul C McCord

(57) ABSTRACT

Disclosed is a method and apparatus for label encoding in a multi-sound event interval. The method includes identifying an event interval in which a plurality of sound events occurs in a sound signal, separating a sound source into sound event signals corresponding to each sound event by performing sound source separation on the event interval, determining energy information for each of the sound event signals, and performing label encoding based on the energy information.

9 Claims, 4 Drawing Sheets

(56) References Cited

U.S. PATENT DOCUMENTS

2020/0312350 A1  10/2020  Lim et al.

OTHER PUBLICATIONS

Annamaria Mesaros et.al, "Metrics for Polyphonic Sound Event Detection", Applied sciences, MDPI AG, Jun. 2016.

Sangwon Suh et.al, "Dual CNN Structured Sound Event Detection Algorithm Based on Real Life Acoustic Dataset", Korean Institute of Broadcast and Media Engineers, Nov. 2018, vol. 23, No. 6, pp. 855-865.

Yuxin Huang et.al, "Multi-Branch Learning for Weakly-Labeled Sound Event Detection", Acoustics, Speech and Signal Processing (ICASSP), ICASSP 2020-2020 IEEE International Conference on, IEEE, May 2020, vol. 2020, No. 5, pp. 641-645.

\* cited by examiner

METHOD AND APPARATUS FOR LABEL ENCODING IN POLYPHONIC SOUND EVENT INTERVALS

CROSS-REFERENCE TO RELATED APPLICATION

This application claims the benefit of Korean Patent Application No. 10-2021-0034713 filed on Mar. 17, 2021, in the Korean Intellectual Property Office, the entire disclosure of which is incorporated herein by reference for all purposes.

BACKGROUND

1. Field of the Invention

One or more example embodiments relate to a method and apparatus for label encoding, and more particularly, to a method and apparatus for label encoding in an interval in which a multi-sound event occurs.

2. Description of the Related Art

Generally, a one-hot label encoding process is performed to obtain ground truth information needed for training a deep neural network-based sound event recognition model.

In an existing label encoding process, an annotation process may be firstly performed to find a label of a sound event recognizable by the human ear and information associated with an onset and an offset time of the sound event from a sound signal recorded in real life. A label encoding process may be then performed on the label of the sound event and the onset and offset time information obtained through the annotation process, and thus the ground truth information needed for training the deep neural network-based sound event recognition model may be obtained. Here, the ground truth information may be obtained by applying a one-hot encoding method, which sets a value of 1 to an onset/offset interval in which an individual sound event obtained in the annotation process is present and sets a value of 0 to remaining intervals.

However, the sound feature information being generated includes a mixture of multi-sound event components occurring simultaneously. Thus, an error based on the label encoding may occur in the ground truth information and recognition performance of the deep neural network-based sound event recognition model may be limited.

Thus, there is a need for a label encoding method that may output new ground truth information reflecting other sound event effects occurring simultaneously in an interval in which the multi-sound event occurs.

SUMMARY

Example embodiments provide a method and apparatus for performing label encoding based on energy information for each of sound events of a sound signal included in a multi-sound event interval.

Example embodiments provide a method and apparatus for improving sound event recognition performance of a sound event recognition apparatus including a deep neural network-based sound event recognition model by increasing learning effect of the deep neural network-based sound event recognition model.

According to an aspect, there is provided a label encoding method including identifying an event interval in which a plurality of sound events occurs in a sound signal, separating a sound source into sound event signals corresponding to each sound event by performing sound source separation on the event interval, determining energy information for each of the sound event signals, and performing label encoding based on the energy information.

The label encoding method may further include segmenting the sound signal into a plurality of segmentation intervals using onset information and offset information for each sound event included in annotation information of the sound signal.

The identifying of the event interval may include identifying a segmentation interval included in a plurality of sound events as an event interval by searching for a number of sound events included in each of the segmentation intervals.

The performing of the label encoding may include performing label encoding on each of the sound events included in the event interval using energy information for each of the sound events included in the event interval and a sum, a scale factor, and a bias of energy information of the sound events included in the event interval.

The scale factor and the bias may be factors used for training a deep neural network, and a sum may be determined to have a preset value.

According to another aspect, there is provided a label encoding apparatus including an event interval identifier configured to identify an event interval in which a plurality of sound events occurs in a sound signal, a sound source separator configured to separate a sound source into sound event signals corresponding to each sound event by performing sound source separation on the event interval, an energy information determiner configured to determine energy information for each of the sound event signals, and an encoder configured to perform label encoding based on the energy information.

The label encoding apparatus may further include an event segmentator configured to segment the sound signal into a plurality of segmentation intervals using onset information and offset information for each sound event included in annotation information of the sound signal.

The event interval identifier may identify a segmentation interval included in a plurality of sound events as an event interval by searching for a number of sound events included in each of the segmentation intervals.

The encoder may perform label encoding on each of the sound events included in the event interval using energy information for each of the sound events included in the event interval and a sum, a scale factor, and a bias of energy information of sound events included in the event interval.

The scale factor and the bias may be factors used for training a deep neural network, and a sum may be determined to have a preset value.

Additional aspects of example embodiments will be set forth in part in the description which follows and, in part, will be apparent from the description, or may be learned by practice of the disclosure.

According to example embodiments, it is possible to improve learning effect of a deep neural network-based sound event recognition model by performing label encoding based on energy information for each of sound events of a sound signal included in a multi-sound event interval.

According to example embodiments, it is possible to improve sound event recognition performance of a sound event recognition apparatus including a deep neural network-based sound event recognition model by increasing learning effect of the deep neural network-based sound event recognition model.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
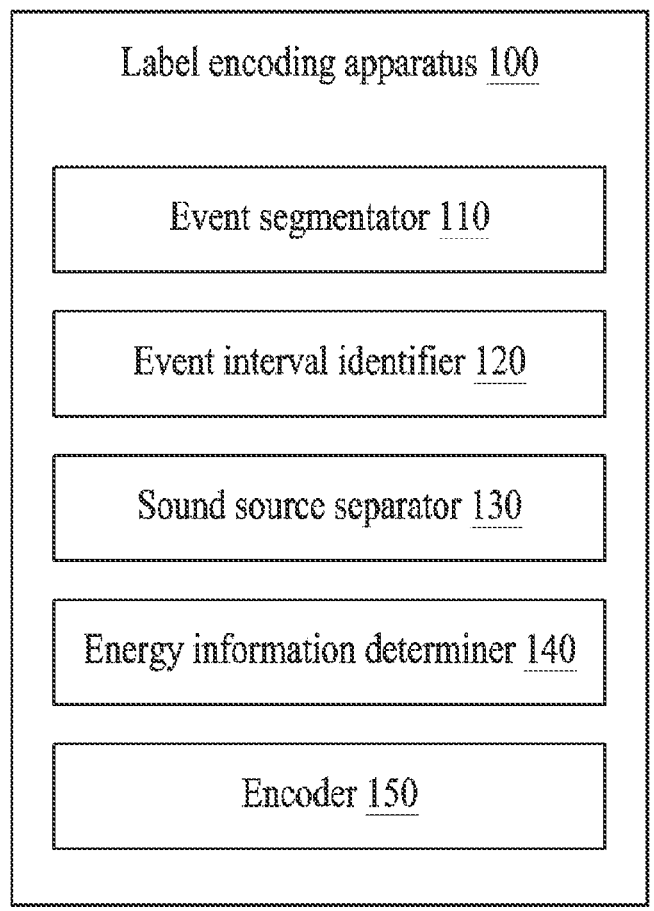
FIG. 1 is a diagram illustrating an example of a label encoding apparatus according to an example embodiment.

Hereinafter, example embodiments will be described in detail with reference to the accompanying drawings. Various modifications may be made to example embodiments. However, it should be understood that these embodiments are not construed as limited to the illustrated forms and include all changes, equivalents or alternatives within the idea and the technical scope of this disclosure.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

FIG. 1 is a diagram illustrating an example of a label encoding apparatus according to an example embodiment.

As illustrated in FIG. 1, a label encoding apparatus 100 may include an event segmentator 110, an event interval identifier 120, a sound source separator 130, an energy information determiner 140, and an encoder 150. Here, the event segmentator 110, the event interval identifier 120, the sound source separator 130, the energy information determiner 140, and the encoder 150 may be different processors, or separate modules included in a program executed by one processor.

The event segmentator 110 may segment a sound signal into a plurality of segmentation intervals using onset information and offset information for each sound event included in annotation information of the sound signal.

The event interval identifier 120 may identify an event interval in which a plurality of sound events occurs in the sound signal. Here, the event interval identifier 120 may search for the number of sound events included in each of the segmentation intervals segmented by the event segmentator 110. In addition, the event interval identifier 120 may identify the searched segmentation interval that includes a plurality of sound events among the segmentation intervals as the event interval.

The sound source separator 130 may perform sound source separation on the event interval identified by the event interval identifier 120 and separate sound event signals corresponding to each sound event.

Here, the sound event signals separated by the sound source separator 130 may be expressed as a time domain signal or a frequency domain signal. When the sound event signals separated by the sound source separator 130 are time domain signals, the energy information determiner 140 may transform the separated sound event signals into a frequency domain signal by applying a Fourier transform (FT). For example, when the sound signal includes a multi-sound event in which a screaming sound and a running sound are simultaneously generated, the sound source separator 130 may separate the sound event signals "screaming" and "running" into separate sound event signals.

The energy information determiner 140 may determine energy information of each of the sound event signals separated by the sound source separator 130. For example, when a separated signal is a time domain signal, the energy information determiner 140 may determine a sum $\Sigma |x(t)|^2$ of squares of the corresponding time component as an energy value of the separated individual sound event signals. In addition, when the separated signal is a frequency domain signal, the energy information determiner 140 may determine a sum $\Sigma |X(f)|^2$ of squares of the corresponding frequency components as an energy value of the separated individual sound event signals.

The encoder 150 may perform label encoding based on energy information determined by the energy information determiner 140. Here, the encoder 150 may perform label encoding on each of the sound events included in the event interval using energy information for each of the sound events included in the event interval and a sum, a scale factor, and a bias of energy information of the sound events included in the event interval. Here, the scale factor and the bias may be factors used for training a deep neural network model and a sum may be determined to have a preset value.

The label encoding apparatus 110 may increase learning effect of the deep neural network-based sound event recognition model by performing label encoding based on the energy information for each of the sound events of the sound signal included in a multi-sound event interval.

In addition, the label encoding apparatus 110 may improve sound event recognition performance of a sound event recognition apparatus including the deep neural network-based sound event recognition model by increasing the learning effect of the deep neural network-based sound event recognition model.

The label encoding apparatus 110 may apply sound event recognition technology for improving recognition performance in various application fields such as the fields of danger avoidance, facility security monitoring, media automatic tagging, situational awareness, environmental noise monitoring, and equipment condition monitoring for the elderly, people with hearing loss, and smart cars, and thus provide an economically beneficial effect.

Figure 2:
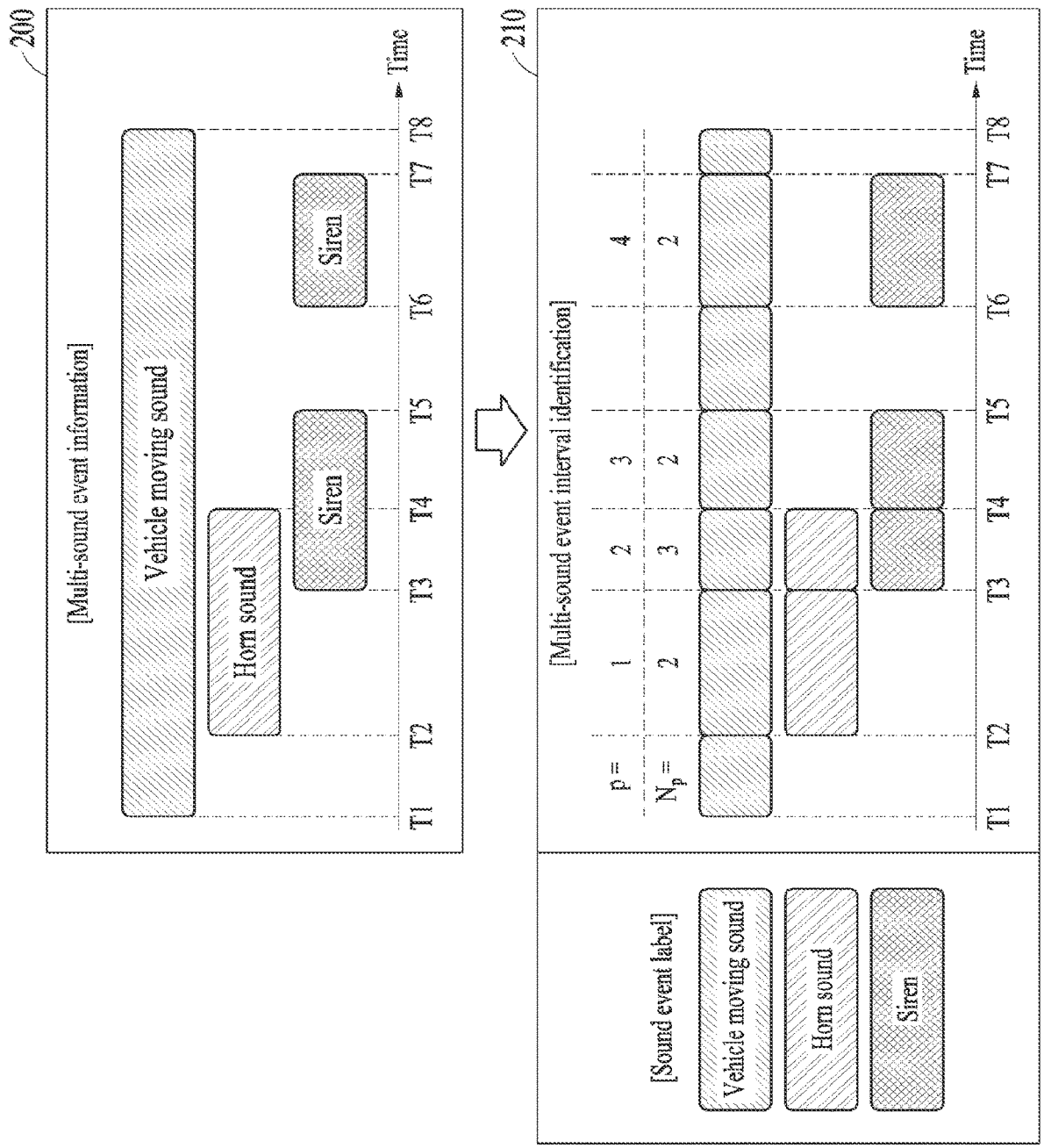
FIG. 2 is a diagram illustrating an example of a process of identifying a plurality of sound event intervals according to an example embodiment.

FIG. 2 is a diagram illustrating an example of a process of identifying a plurality of sound event intervals according to an example embodiment.

As illustrated in FIG. 2, the event segmentator 110 may receive a sound signal 200 including an event interval in which a plurality of sound events occurs.

In addition, the event segmentator 110 may segment the sound signal 200 into a plurality of segmentation intervals 210 by performing a segmentation process on the event interval based on annotation information.

Here, the segmentation intervals 210 may be determined by arranging onset information and offset information for each sound event included in the annotation information in a chronological order.

For example, a segmentation interval T1 may start at an onset of a vehicle moving sound, and a segmentation interval T2 may start at an onset of a horn sound. A segmentation interval T3 may start at an onset of a first siren sound, a segmentation interval T4 may start at an offset of the horn sound, and a segmentation interval T5 may start at an offset of the first siren.

In addition, the event interval identifier 120 may search for the number of sound events included in each of the segmentation intervals 210 segmented by the event segmentator 110. Here, the event interval identifier 120 may identify a segmentation interval that includes a plurality of sound events among the segmentation intervals 210 as the event interval.

In FIG. 2, p may be an index for an interval in which a multi-sound event occurs, and $N_p$ may be the number of sound events generated in a pth multi-sound event interval.

Figure 3:
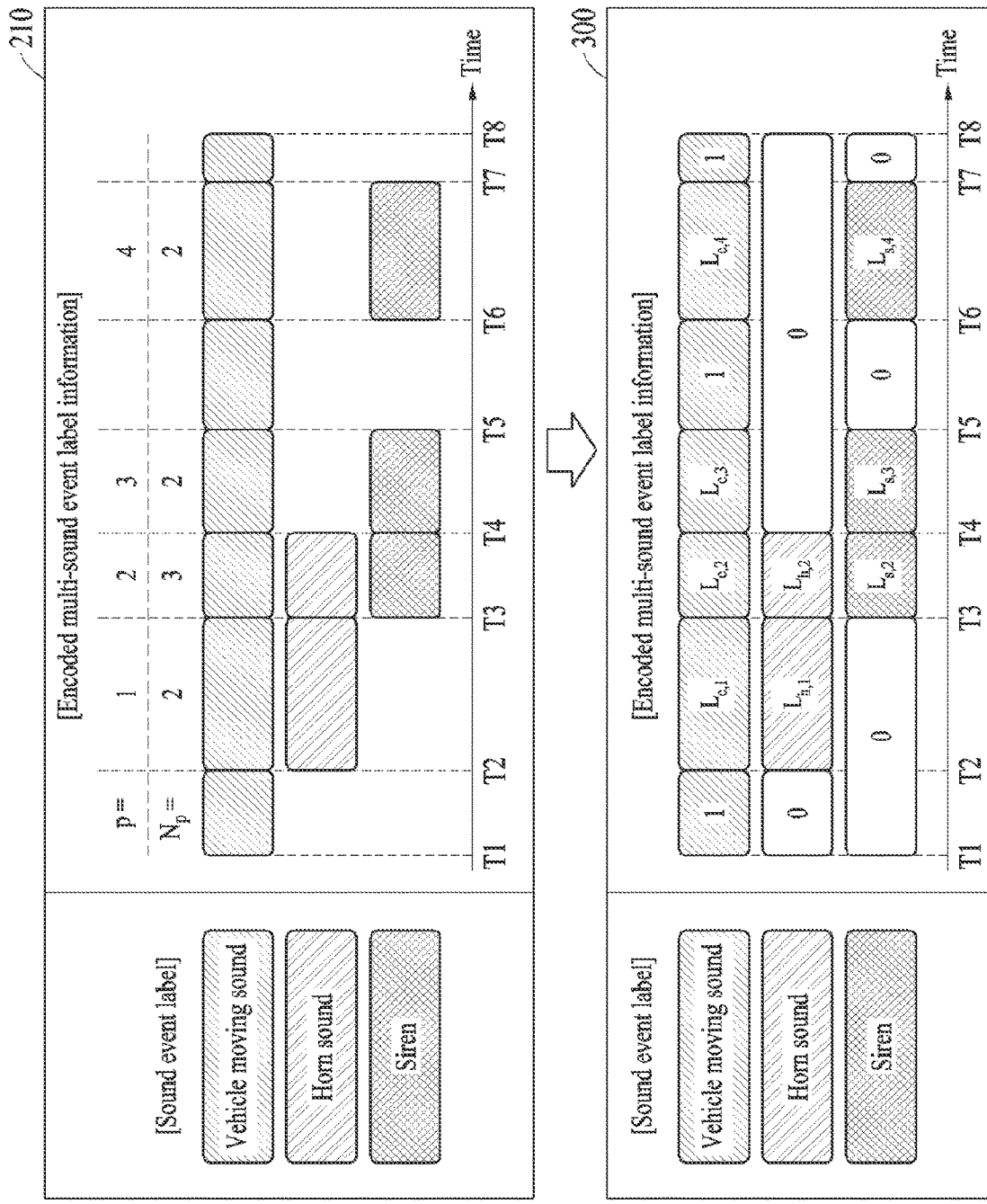
FIG. 3 is a diagram illustrating an example of a process of performing label encoding on a plurality of sound event intervals according to an example embodiment.

FIG. 3 is a diagram illustrating an example of a process of label encoding on a plurality of sound event intervals according to an example embodiment.

The encoder 150 may perform label encoding 300 for each segmentation intervals 210 based on energy information determined by the energy information determiner 140. In FIG. 3, a "car_passing_by" sound event may be represented by $L_{l,p}$, a horn sound event may be represented by $L_{h,p}$, and a siren sound event may be represented by $L_{s,p}$ wherein a k index having an $L_{k,p}$ value is replaced with the first letter of the English label of an individual sound event.

For example, the encoder 150 may perform label encoding 300 based on the energy information of the individual sound event using Equation 1.

$$L_{k,p} = \alpha \frac{e_{k,p}}{E_p} + \beta \quad \text{[Equation 1]}$$

In Equation 1, $L_{k,p}$ denotes encoded label information for a kth sound event in a pth multi-sound event interval. $e_{k,p}$ denotes sound event energy information for the kth sound event in the pth multi-sound event interval, and $E_p$ denotes an energy sum of individual sound events in the pth multi-sound event interval. For example, $E_p$ may be calculated based on Equation 2.

$$E_p = \sum_{k=1}^{N_p} e_{k,p} \quad \text{[Equation 2]}$$

In Equation 2, $N_p$ denotes a number of sound events generated in a pth multi-sound event interval. A scale factor α and a bias β may be factors added for effectively training a deep neural network model and be set to satisfy a condition of Equation 3.

$$\alpha + \beta = 1 \quad \text{[Equation 3]}$$

Figure 4:
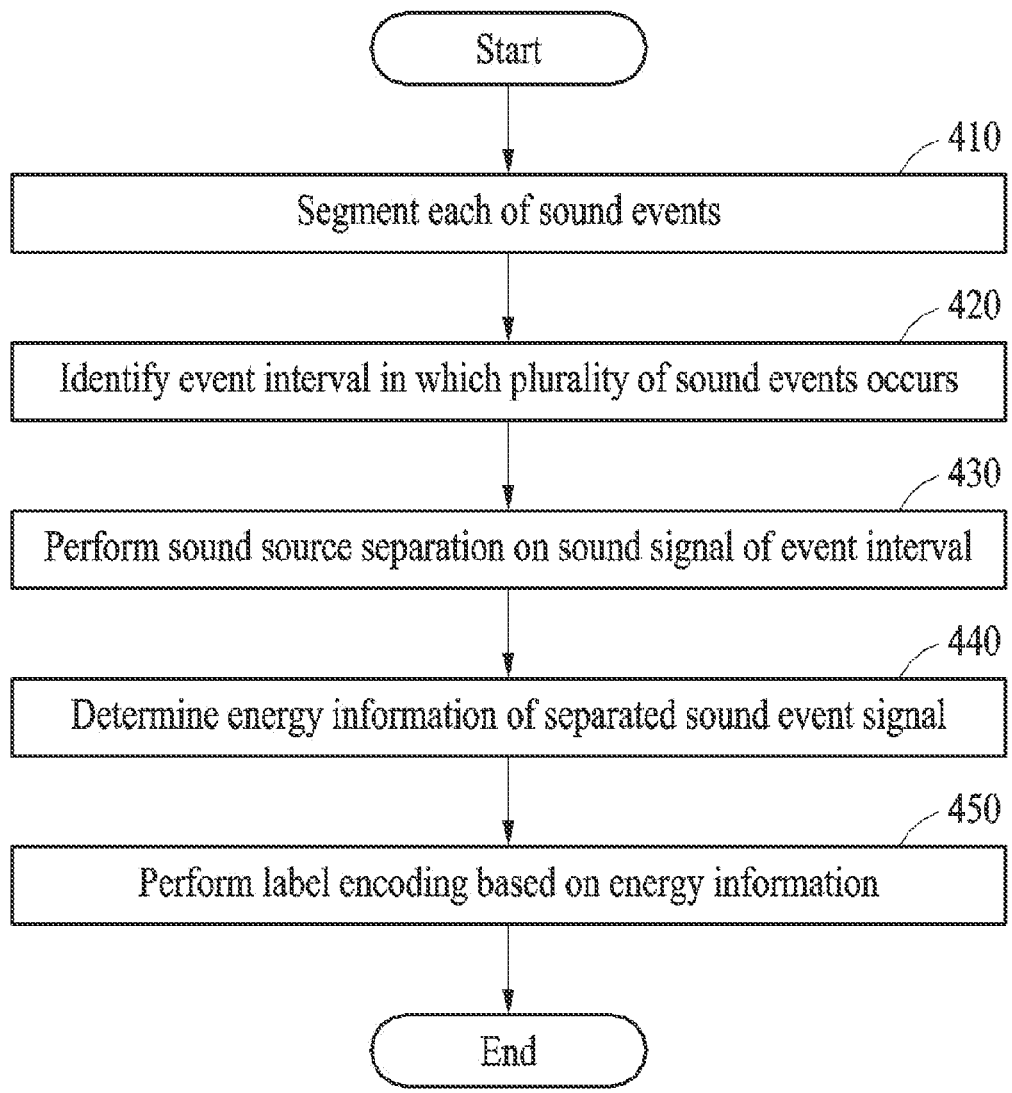
FIG. 4 is a diagram illustrating an example of a label encoding method according to an example embodiment.

FIG. 4 is a diagram illustrating an example of a label encoding method according to an example embodiment.

In operation 410, the event segmentator 110 may segment a sound signal into a plurality of segmentation intervals using onset information and offset information for each sound event included in annotation information of the sound signal.

In operation 420, the event interval identifier 120 may identify an event interval in which a plurality of sound events occurs in the sound signal. Here, the event interval identifier 120 may identify a segmentation interval including the plurality of sound events among the segmentation intervals segmented in operation 410 as the event interval.

In operation 430, the sound source separator 130 may perform sound source separation on the event interval identified in operation 420 and separate sound event signals corresponding to each sound event.

In operation 440, the energy information determiner 140 may determine energy information for each of the sound event signals separated in operation 430.

In operation 450, the encoder 150 may perform label encoding based on the energy information determined in operation 440. Here, the encoder 150 may perform label encoding on each of the sound events included in the event interval using energy information for each of the sound events included in the event interval and a sum, a scale factor, and a bias of energy information of the sound events included in the event interval.

According to example embodiments, it is possible to improve learning effect of a deep neural network-based sound event recognition model by performing label encoding based on energy information for each of sound events of a sound signal included in a multi-sound event interval.

According to example embodiments, it is possible to improve sound event recognition performance of a sound event recognition apparatus including the deep neural network-based sound event recognition model by increasing learning effect of the deep neural network-based sound event recognition model.

Meanwhile, the label encoding method and apparatus described herein may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include all computer storage media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A label encoding method, comprising:
    identifying an event interval in which a plurality of sound events occurs in a sound signal;
    separating a sound source into sound event signals corresponding to each sound event by performing sound source separation on the event interval;
    determining energy information for each of the sound event signals; and
    performing label encoding based on the energy information,
    wherein determining energy information comprises:
    when a separated individual sound event signal is a time domain signal, determining a sum of squares of the corresponding time component as an energy value of the separated individual sound event signals,
    when the separated individual sound event signal is a frequency domain signal, determining a sum of squares of the corresponding frequency components as an energy value of the separated individual sound event signals, and
    wherein each label includes a scale factor and a bias of energy as expressed in the following equation:

$$L_{k,p} = \alpha e_{k,p}/E_p + \beta$$

in which $L_{k,p}$ denotes encoded label information for a $k^{th}$ sound event in a $p^{th}$ multi-sound event interval, $e_{k,p}$ denotes sound event energy information for the $k^{th}$ sound event in the $p^{th}$ multi-sound event interval, $E_p$ denotes an energy sum of individual sound events in the $p^{th}$ multi-sound event interval, $\alpha$ is the scale factor and $\beta$ is the bias.

2. The label encoding method of claim 1, further comprising:
    segmenting the sound signal into a plurality of segmentation intervals using onset information and offset information for each sound event comprised in annotation information of the sound signal.

3. The label encoding method of claim 2, wherein the identifying of the event interval comprises:
    identifying a segmentation interval comprised in a plurality of sound events as an event interval by searching for a number of sound events comprised in each of the segmentation intervals.

4. The label encoding method of claim 1, wherein $E_p$ is expressed by the following equation:

$$E_p = \sum_{k=1}^{N_p} e_{k,p}$$

in which $N_p$ denotes a number of sound events generated in a $p^{th}$ multi-sound event interval.

5. A non-transitory computer-readable storage medium storing instructions that, when executed by a processor, cause the processor to perform the label encoding method of claim 1.

6. A label encoding apparatus, comprising:
    an event interval identifier configured to identify an event interval in which a plurality of sound events occurs in a sound signal;
    a sound source separator configured to separate a sound source into sound event signals corresponding to each sound event by performing sound source separation on the event interval;
    an energy information determiner configured to determine energy information for each of the sound event signals; and
    an encoder configured to perform label encoding based on the energy information,
    wherein determining energy information comprises:
    when a separated individual sound event signal is a time domain signal, determining a sum of squares of the corresponding time component as an energy value of the separated individual sound event signals, when the separated individual sound event signal is a frequency domain signal, determining a sum of squares of the corresponding frequency components as an energy value of the separated individual sound event signals, and wherein each label includes a scale factor and a bias of energy as expressed in the following equation:

$$L_{k,p} = \alpha e_{k,p}/E_p + \beta$$

in which $L_{k,p}$ denotes encoded label information for a $k^{th}$ sound event in a $p^{th}$ multi-sound event interval, $e_{k,p}$ denotes sound event energy information for the $k^{th}$ sound event in the $p^{th}$ multi-sound event interval, $E_p$ denotes an energy sum of individual sound events in the $p^{th}$ multi-sound event interval, $\alpha$ is the scale factor and $\beta$ is the bias.

7. The label encoding apparatus of claim 6, further comprising:

an event segmentator configured to segment the sound signal into a plurality of segmentation intervals using onset information and offset information for each sound event comprised in annotation information of the sound signal.

8. The label encoding apparatus of claim 7, wherein the event interval identifier is configured to:

identify a segmentation interval comprised in a plurality of sound events as an event interval by searching for a number of sound events comprised in each of the segmentation intervals.

9. The label encoding apparatus of claim 6, wherein $E_p$ is expressed by the following equation:

$$E_p = \sum_{k=1}^{N_p} e_{k,p}$$

in which $N_p$ denotes a number of sound events generated in a $p^{th}$ multi-sound event interval.

* * * * *